United States Patent [19]
Bunks et al.

[11] Patent Number: 6,049,758
[45] Date of Patent: Apr. 11, 2000

[54] RESERVOIR MONITORING

[75] Inventors: Carey D. Bunks, Boston; James E. Barger, Winchester, both of Mass.

[73] Assignee: BBN Corporation, Cambridge, Mass.

[21] Appl. No.: 08/876,648

[22] Filed: Jun. 16, 1997

[51] Int. Cl.⁷ .................................................. G06F 19/00
[52] U.S. Cl. ............................................................ 702/14
[58] Field of Search ............................ 702/16, 17, 18, 702/12, 13, 14; 367/73, 72, 56, 57

[56] References Cited

U.S. PATENT DOCUMENTS

| | | | |
|---|---|---|---|
| 4,363,112 | 12/1982 | Widrow | 367/30 |
| 4,365,322 | 12/1982 | Widrow | 367/32 |
| 4,969,130 | 11/1990 | Wason et al. | 367/73 |
| 5,105,391 | 4/1992 | Rice et al. | 367/58 |
| 5,253,217 | 10/1993 | Justice, Jr. et al. | 367/46 |
| 5,586,082 | 12/1996 | Anderson et al. | 367/73 |
| 5,798,982 | 8/1998 | He et al. | 702/14 |

OTHER PUBLICATIONS

Bibee, L.d., et al., Seismic Penetrator Technology for Use in Shallow Water Seismoacoustics, Proc. of OCEANS '93, Oct. 18–21, 1993, pp. I–450–I–454.

Ali, H.B., Oceanographic Variability in Shallow–Water Acoustics and the Dual Role of the Sea Bottom, IEEE Journal of Oceanic Engineering, Jan. 1993, pp. 31–41.

*Primary Examiner*—Donald E. McElheny, Jr.
*Attorney, Agent, or Firm*—Leonard Charles Suchyta; Floyd E. Anderson

[57] ABSTRACT

A method for reducing the time, cost and apparatus required for monitoring the geometry of the oil/water, oil/gas, or gas/water interface in an underground reservoir. By strategically placing sources and sensors, and by fixing the sensors to the solid earth surface beneath the water, and by knowing the velocity fields in the overburden, the changing edges and geometry of the oil may be determined with significantly reduced data gathering. The strategic positions of the sources and receivers is determined by referencing to the known geometry from past surveys. In addition the velocity of the overburden is known by these prior surveys. In addition, higher resolution of reflectivity areas is achieved by use of sound sources capable of generating higher frequencies compensated for the earth's attenuation and by utilizing long integration times to improve signal to noise ratio. These sound sources can be smaller than prior art sources since they provide directed beams of narrower widths. Smaller computers may be used for analyzing the reduced data collected.

16 Claims, 8 Drawing Sheets

RESERVOIR MONITORING

FIELD OF THE INVENTION

The present invention relates generally to seismic surveying and oil reservoir monitoring. More specifically, the present invention relates to a method and apparatus needed to perform seismic surveys and derive useful information on the changing three dimension (3D) geometry of oil in a reservoir over time. A slice through a 3D volume is referred to and defined herein as a 2D representation. The time changing 3D is referred to and herein defined as 4D seismic surveying. The present invention is directed to reducing the cost, scheduling and logistics involved with 4D surveying, including the amount of equipment, the time to collect the data, and the time to computer analyze and interpret the seismic data.

BACKGROUND OF THE INVENTION

In 4D imaging, gathering and analyzing information in order to monitor the changing geometry of the oil/water, oil/gas or gas/water boundary in a reservoir is a time consuming and expensive process. In prior art practice, seismic information is gathered periodically by activating or firing sources and sensing the reflections. The data are processed and a calculated result determines reflectivity changes over time as water replaces oil in a reservoir. Such seismic information is gathered in land and marine environments. On land the arrays of source and receivers are moved after each seismic data taking, whereas in marine environments the arrays of sources and receivers are towed behind boats in overlapping patterns.

Specialized companies perform such services and the demand for these services makes scheduling difficult. The services are expensive and dangerous when operating around existing oil platforms and other shipping as the arrays may be up to 3 kilometers long.

Monitoring of the oil geometry is important since the productivity of the reservoir may be in jeopardy, and early knowledge may be critical so that action may be taken to stem the loss of production or otherwise manage and plan for future production rates. In FIG. 1, item 1 is a rudimentary characterization of an earlier outline of the oil geometry of a known reservoir. Oil producing wells are shown 3. However, at a later time the dotted line 5 shows the oil geometry where well 3' is non-producing and 3" is isolated from the rest of the oil. Such information is needed for proper planning and action regarding this oil reservoir. There are known techniques that may be used to boost production of the oil producing wells that experience production losses. For example, side wells may be drilled, forcing water or steam or modulating flow rates are some known techniques.

With regard to oil reservoirs beneath the sea, navigation is recorded and is crucial to proper surveying since the location must be known and repeatable. The resolution of such prior art surveying is likely no better than 6% from survey to survey. Ships constantly troll with several hundred hydrophones trailing behind in multiple streamers. An energy source (usually an air gun array), often closest to the ship, is positioned along one of more of the streamers and fired at 5 to 10 second intervals. The reflected seismic waves or signals are received by hydrophone streamers that, as stated above, may be as long as 3 kilometers. Several hundred hydrophones may receive the signals after each firing. The signals are digitized and recorded on magnetic tape. After acquisition, the data is processed and interpreted by large computers. This processing comprises: 1) deconvolution, 2) stacking, and 3) migration. Each of these steps may be further analyzed into sub-steps. U.S. Pat. No. 5,349,527 ('527), issued on Sep. 9, 1994, assigned to Schlumberger Technology Corp., suggests that the costs of taking and processing the data run into millions of dollars and take weeks of processing time on very large computers. The time and cost is a limitation on the use of such procedures.

An inherent problem of the prior art techniques that make the data reduction difficult is that source signals may take many paths to the sensors, and since the sources produce energy along widely dispersed directions there are multiple reflections and refractions which may be received by the sensors. Furthermore, the geometric and velocity structure of the reservoir's overburden are not known.

In view of the above difficulties, techniques have been developed to migrate the data to place the reflection event at the appropriate physical location in the subsurface. These techniques and others are detailed in an article printed in RESERVOIR GEOPHYSICS, authored by Robert E. Sheriff, in 1992. This article is hereby incorporated herein by reference as though laid out in full. However, implementation of these techniques, as noted above, requires large amounts of data just to position the reflection points. FIG. 2 illustrates the use of one such technique, called the Kirchoff's method of migration. The half ellipse 4 is the set of points that will give rise to a set of reflections all sharing the same travel time, assuming a uniform velocity field and a source and receiver at each focus of the ellipse. It is noted that this method can be extended, as known in the art, to heterogeneous velocity fields and multiple true reflections. With the source 2 at one focus and the receiver 6 is at the other focus, the specular seismic ray of interest, the true reflection from the surface 10 is shown in the solid line 8. In this example, there is a true reflection 8, but the location of the surface 10 is not known since other reflections anywhere on the ellipse 4, say ray 9 as reflected from point 7, have the same travel time. In this specific example assume that there is only one reflective surface 10, at the bottom of the ellipse 4. However, the technique as known in the art is applicable to true reflective surfaces at other locations along the ellipse 4. If the source and receiver are moved to locations 2' and 6', respectively, and the source is fired the reflection from the surface 10 defines ellipse 4'. Ray 8' will have the same travel time for ellipse 4' as did ray 8 in ellipse 4. But, the travel time from location 7 on the ellipse 4 will be different when the source is at location 2'. Any reflection from point 7 will define a larger ellipse and the accompanying longer time of travel. But since there is no reflective surface at point 7 (in this example) there will be no reflection signal received that corresponds to that larger ellipse. By repeatedly (say forty to fifty times) moving the source/receiver and firing the source, new ellipses are formed and by superimposing many such ellipses calculated from the many firings, the specular ray of interest reflected from surface 10 will be reinforced in each ellipse thereby determining the actual location of the reflective surface 10. The possible alternative points along the first ellipse will destructively reinforce (since there are no reflective surfaces in this example).

In partial summary, the above processes have the following limitations: a) large amounts of data must be taken, b) processing of the data is time consuming and expensive, c) specialized companies perform these services and the acquiring and scheduling of these services may be difficult, and d) data collecting may impede or be impeded by production operations.

It is an object of the present invention to use the prior knowledge of the geometric and velocity structure of the reservoir's overburden obtained from previous 2D and 3D seismic surveys to minimize the subsequent data acquisition and processing to perform 4D reservoir imaging.

Another object of the present invention is to reduce the scheduling problems and logistics of 4D imaging, and to provide a less time consuming process of collecting 4D imaging data.

It is another object of the present invention to maintain sensitivity of ±1% over the frequency bands of interest herein.

It is yet another object of the present invention to detect the changing geometry of a 4% impedance discontinuity with at least 4% positioning resolution.

It is another object of the present invention to lower data acquisition time and the need for large computers by utilizing data from prior surveys.

It is an object to use fewer sensors by locating source firings or operations such that single receivers may receive specular reflections from more than one area or patch on the oil reservoir.

It is another object to collect a minimum amount of seismic data while providing higher resolution than with prior art apparatus and techniques.

Yet another object to pre-calculate positions of sources and sensors from known data and to determine therefrom a time window in which to gather data.

SUMMARY OF THE INVENTION

The foregoing objects are met in a method of gathering seismic information of an oil/water, oil/gas or gas/water interface edges and the 3D geometry (herein geometry is defined as inclusive of the edges) of the oil reservoir over time as illustrated in FIG. 9, where known surveys of the reservoir 910 exist and the velocity field of the overburden is known 905, comprising the steps of: a) placing at least one seismic source at a location, 930 b) fixing said at least one seismic sensor to the solid surface of the earth, where said at least one source and at least one sensor are strategically positioned to yield a specular reflection, based on the known survey and the known velocity field, herein defined as the velocity of the seismic signal in traveling to and from the reservoir, 935 c) firing said at least one source 940, receiving specular signals from said firing 945, d) comparing said signals to said prior known geometry of the reservoir 950, and e) mapping the changing geometry of the oil 955 in the reservoir. Often one receiver can be arranged to receive the specular signals from one or more areas or patches on and in the reservoir by strategic positioning of a source.

The inventive method includes receiving specular signal rays of zero offset where the source and the receiver are substantially at the same location, and non-zero offset where the source and receiver are at different locations, as more fully discussed later. Of course, there may be, in preferred embodiments, a plurality of seismic sources and sensors. In a preferred embodiment from the known information of the reservoir, a directed source can be fired and a time window can be determined such that only specular signals from the target reservoir are received.

In addition to the above inventive process steps, other such process steps as shown in FIG. 10 may include in a preferred embodiment: a) determining the 3D geometry of the oil in said reservoir from the known prior data including the velocity field of the overburden; 1010 b) dividing this known 3D geometry into patches or areas of known surface dimensions; 1005 c) placing receivers or sensors for receiving specular reflections (zero offset signal or non-zero offset reflections) from each patch; 1025 d) determining a minimum number of sources and sensors 1015 and a time window 1020 for receiving said specular signals needed to map the geometry of oil in the reservoir, e) activating the sources, 1040 and f) deconvolving the received data, 1045 and g) selecting only a portion of the deconvolved data, 1050 wherein the selected data is associated with the time window.

In a preferred embodiment of the invention as applied to reservoirs under water, the sensors are strategically fixed to the solid surface under the water, and the sources are directed with cones of dispersion narrower than in prior art sources by a technique known as end firing, as later described.

The objects of the present invention are also met with apparatus for gathering seismic information of the oil geometry over time comprise: at least one seismic source, at least one seismic sensor fixed with respect to location the solid surface of the earth, and where said at least one source and at least one sensor are strategically positioned based on the known surveys showing the geometry of the oil in the reservoir and the velocity field associated with the reservoir and the overburden, means for firing said at least one source such that signals are reflected and received by said at least one sensor, means for comparing said received signals to said prior collected signals to determine reflectivity changes, means for relating said reflectivity changes to physical changes of water replacing oil in said reservoir, and means for mapping the changing geometry of the edges of the oil in the reservoir.

Other objects, features and advantages will be apparent from the following detailed description of preferred embodiments thereof taken in conjunction with the accompanying drawings in which:

DETAILED DESCRIPTION OF PREFERRED EMBODIMENTS

Figure 1:
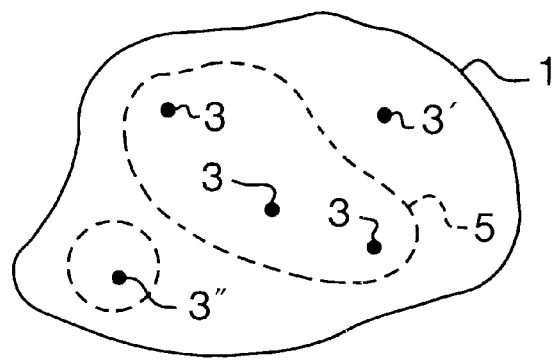
FIG. 1 is a topical map of an oil reservoir.
Figure 2:
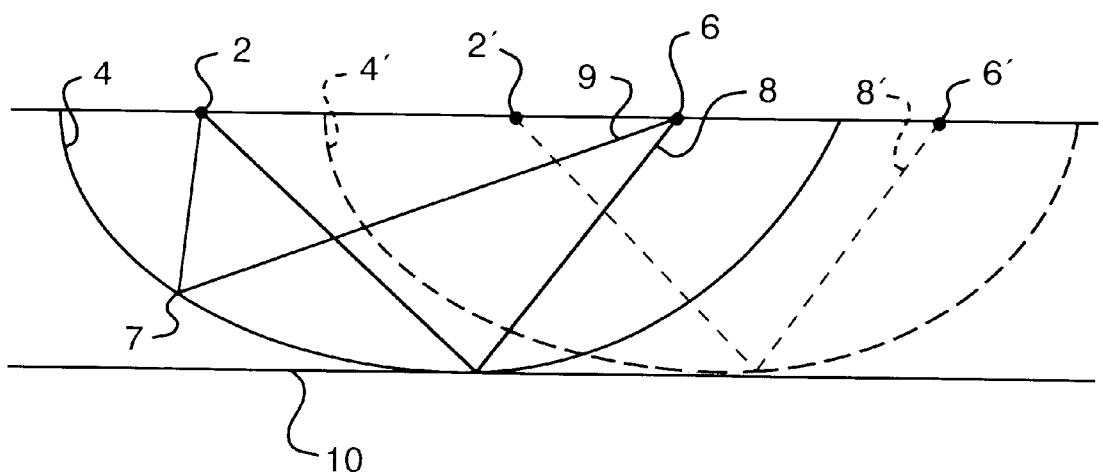
FIG. 2 is a diagram of ray reflections.
Figure 3:
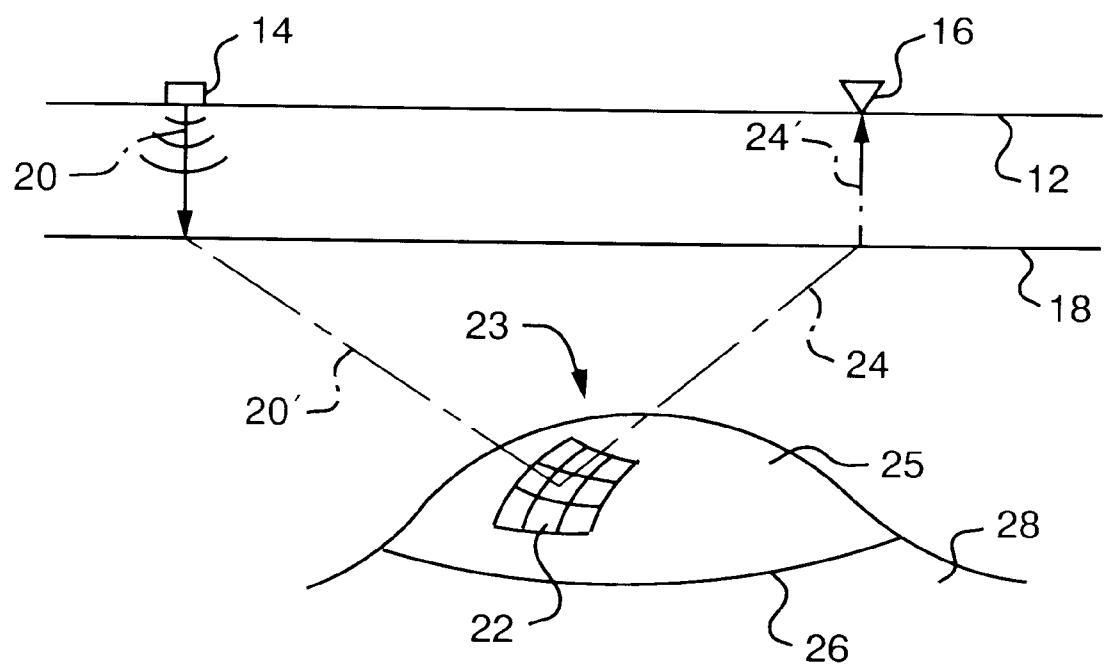
FIG. 3 is a pictorial view of an oil reservoir showing areas or patches whose reflectivity is being monitored.

FIG. 3 is an isometric view of a surface 12 with a single source 14 and a single receiver 16. The line 18 represents a geological interface in the overburden which bends the signal. The source 14 is fired and a signal 20 is sent into the overburden. The signal 20 encounters the interface 18 and its direction is changed 20'. This signal strikes a patch 22 and is reflected 24 back to the interface 18 where it is bent again 24' and then received 16. The dome-like structure 23 represents a oil bearing reservoir 25 separated from water 28 at the reservoir edge 26. The patch 22 represents one of many patches covering the entire dome-like structure and, perhaps, parts of its interior. The size of the patch is determined by the resolution of the seismic data at and within the reservoir. Calculations of the patch size are known in the art, e.g. reference the above referenced Sheriff article. In a preferred embodiment, potential source—receiver pair locations are determined for each patch. The total number of receivers is minimized by locating some receivers to receive specular rays from multiple patches by locating a source at different strategic locations. In marine environments the source may be moved via a boat to the different strategic locations. When the strategic locations of the source and the receiver are known then the travel time for the specular reflection to be received is known and a time window for the particular specular ray is established.

Still referring to FIG. 3, where the dome-like structure represents an oil reservoir, it is apparent that, once all the specular reflections are determined for all the patches, that a minimum amount of equipment and time can be determined. In a preferred embodiment a minimum number of receivers can be determined and permanently located on the solid structure on the land surface or in a marine environment at the bottom of the body of water. By design, the location of sources and receivers can be determined such that the number of receivers is minimized by designing some receivers to receive specular reflection from multiple patches. When the receivers have been installed and the relative positions of source firing and receivers determined along with the respective time windows, the mapping of the reflectivity changes will yield the desired knowledge of the changes in the oil reservoir. In this preferred embodiment, a vibrator source and receivers can be positioned to produce signals that are a measure of the reflectivity from one (or more) patches (again, knowing the velocity and structure of the overburden and the time travel for the specular reflections). With a stationary source, say in an anchored boat, a downward directed beam of energy can be fired or operated (with the overburden interfaces the specular ray tracing may not be direct of course) repeatably to allow multiple collection of specular reflections at the receivers using known techniques of data correlation to improve the signal to noise ratio of the data.

The above techniques optimize and/or minimize the number of receivers, but the technique could be implemented theoretically by minimizing the sources. However, since the receivers, in the preferred embodiments are to be fixed to the land surface or anchored to the solid surface beneath the water, it is preferable to minimize the receivers.

Since an object of the present invention is to monitor the oil/water, oil/gas, or gas/water boundaries, the system must be designed with the required sensitivity for the task. For this purpose a smaller directed source is used as described below, and the Global Position System (GPS) used in the differential mode can be used to inexpensively measure the position of a small boat. Other such positioning systems may also be used.

Figure 4:
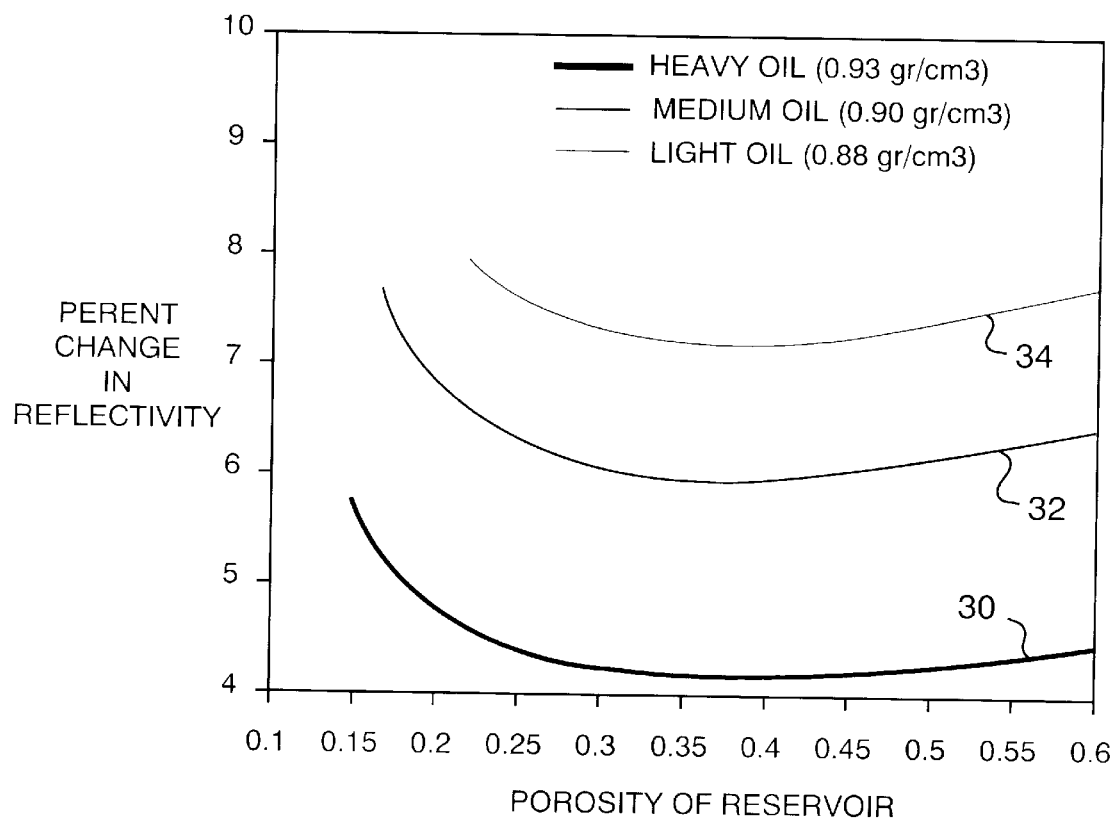
FIG. 4 is a plot of reflectivity changes as water replaces oil.

FIG. 4 is a plot of the percent changes in reflectivity for a normally incident plane wave on an impedance interface between a reservoir and an overburden layer when oil is replaced by water in a porous reservoir structure. Plot 30 is for heavy oil with a density of 0.93 gr/3 32 for oil of 0.90 gr/cm3 and 34 for oil of 0.88 gr/cm3. The overburden for the purposes of this plot has a compression velocity of 2500 m/s and the reservoir rock that of 2700 m/s. The rock density in the cap is 2.5 gr/cm3 with zero porosity. FIG. 4 shows that for these conditions the percent reflectivity change is better than 4%.

The reflectivity changes represented in FIG. 4 indicates that the change from oil to water can be detected if the source frequency and the receiver bandwidth is sufficient to resolve the layer thickness and the signal to noise ratio of the received signal is sufficiently large. Care must observed, however, since the higher frequency is achieved with an amplitude compensated source in the frequency bands where seismic waves are absorbed by the earth.

In a preferred embodiment the energy source is a marine vibrator, described later, that can be activated or fired in a controlled fashion to sweep frequencies from 10 to 200 Hz with high accuracy and energy outputs equivalent to a typical prior art air gun. The vibrator can be compensated for earth's absorption. Moreover, this vibrator is small enough to be carried in a small boat and can be continuously applied to provide long integration times that improve signal to noise ratios. Such vibrators are known in the art, for example, see ELECTROMAGNETIC SHAKERS FOR ACTIVE VIBRATION CONTROL, by Bruce S. Murray of BBN System and Technologies. This paper was presented at the SAE Noise and Vibration Conference and Exposition, Traverse City, Mich., May 15–18, 1995. This paper is incorporated by reference herein as if laid out in full.

Figure 5:
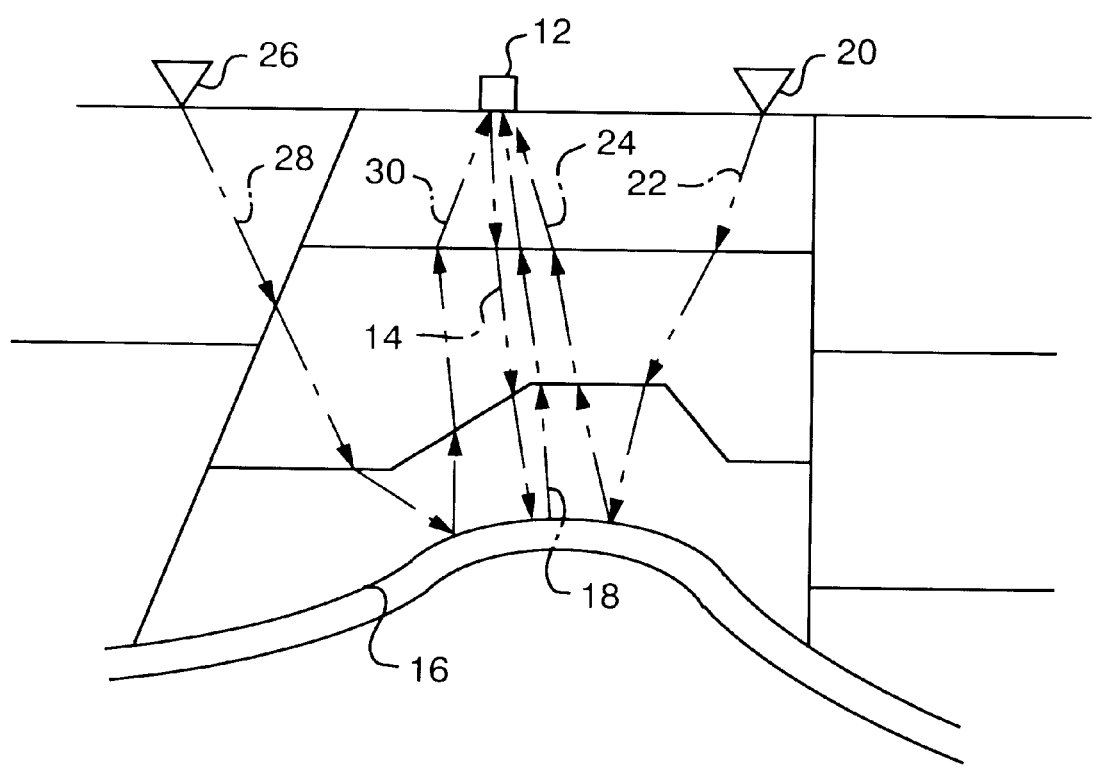
FIG. 5 is a pictorial diagram of optimized use of one source/receiver.

FIG. 5 is a pictorial diagram of optimized use of one source/receiver. It shows the tracing of specular reflections in a particular location with unique geological interfaces. When sources located at 12, 20, 26, are fired, signals 14, 22, 28, are sent into the overburden. As each signal encounters a geological interface, its direction may be changed. The signals 12, 22, 28 eventually strike an oil/rock interface 16 and are reflected back toward the surface 18, 24, 30. The direction of each of the specular reflections 18, 24, 30 is changed differently as the reflections encounter geological interfaces. A receiver located at 12, can receive the specular reflections from all three sources 12, 20, 26 because of the bending of the reflections at the geological interfaces.

Figure 6:
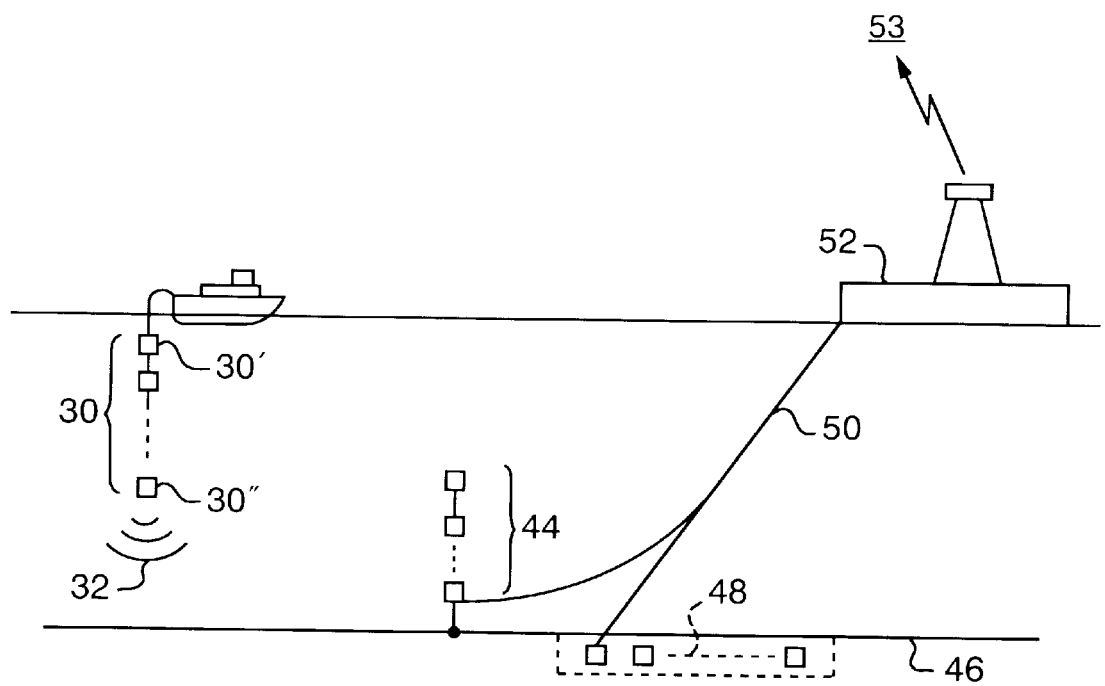
FIG. 6 is a pictorial of a preferred embodiment of the present invention.

FIG. 6 shows a preferred embodiment of the present invention. The sources 30 are vibrators as described above arranged as a vertical array of ten 200 pound sources designed with an output of about 100 watts at 90 Hz. The array is 90 meters long hanging from a stationary boat. Each source is about two feet in diameter and about 1.5 feet long and can generate a one liter displacement at the mid-band frequency. At the formation, this translates to a power of 100 watts per source. Activating a source ten second waveform will produce 100 kJ of sound energy (10 kW is 10 kJ per second and for ten seconds is 100 kJ). At the formation this is about equivalent to an air gun array when efficiency is factored in. In this preferred embodiment a 5 Hp motor serves as the energy source for all ten sources. The sources are fired downward in a synchronized sequence, starting with near source 30', such that each successive firing is in phase with the prior firings. When the last source is fired 30" the vertical line of ten sources radiates as a 10 kW source in the end-fire beam 32.

Referring still to FIG. 6, the sensors 44 are anchored or fixed to the bottom 46. The hydrophones are about ¾ inches in diameter and about 2 inches long. A suitable hydrophone and/or geophone can be obtained from Aliantech (formerly Honeywell) in Washington State. But, other such hydrophones are known and available in the art. The sensors are mounted in a ½ inch diameter nylon-sheathed tube. Each sensor signal is conditioned, sampled, and time domain multiplexed over fiber optic cable. Up to 1000 sensors can be installed with each cable. These cables can be dangled full length, and retrieved by pulling up one end. The sensor array has a twenty year design life if power is constantly supplied to the sensors—there is a one year life to the batteries when battery powered. The sensors may be trenched 48 to avoid damage from trawlers. Still referring to FIG. 6, power may be supplied to the sensors via a cable 50 from a platform 52. Also the cable 50 may contain data lines for controlling the sensors and receiving data from the sensors. The control and information may be transferred via Internet 53 or other such communications.

Figure 7:
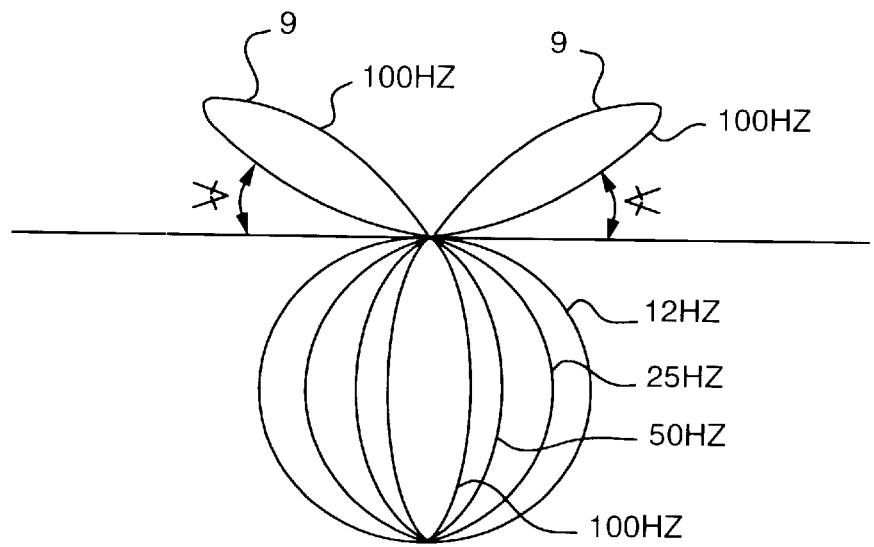
FIG. 7 is a graph of the dispersing effect of sound with frequency in water.

FIG. 7 shows the directivity of the source array of FIG. 6 of a sound power beam pattern generated for several different frequencies. Sound power is greater at higher frequencies to compensate for earth's greater attenuation at the higher frequencies. The sources are linear so that different amount of frequency compensation, by adjusting the input waveforms to the projected array, can be used at the higher frequencies. At 100 Hz there are aliasing lobes but these lobes 9 are direction at an angle of about 45° and do not interfere with the receivers. The vertical array with end-fire virtually eliminates the sound radiated at the free surface (the water surface) and halves the number of water-bottom multiples received due in part to the directivity of the sound power beam.

Figure 8:
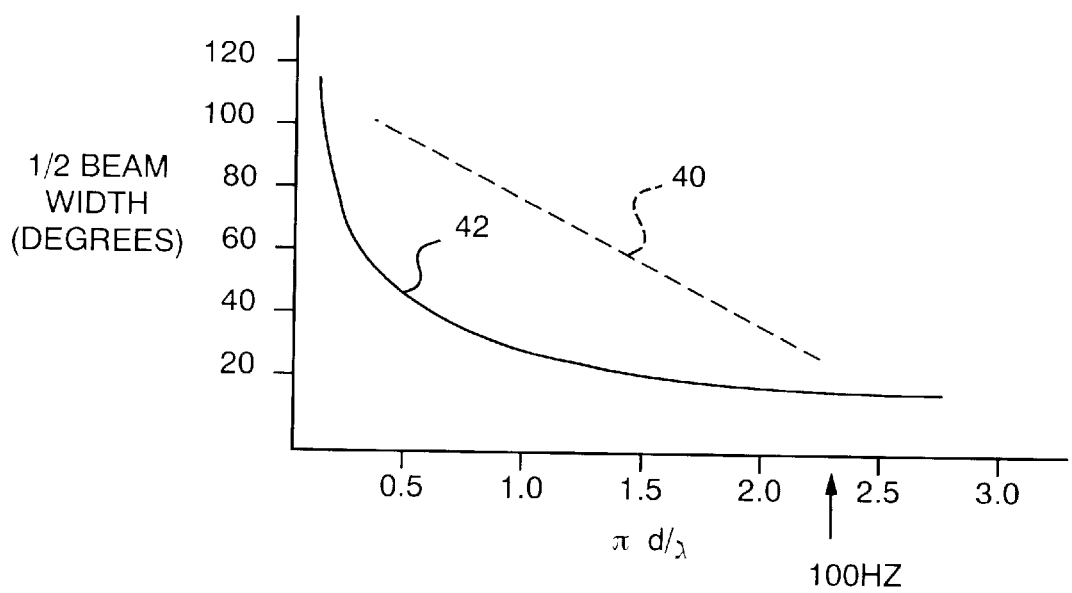
FIG. 8 is a graph of the half beam width of an end-fired source array.
Figure 9:
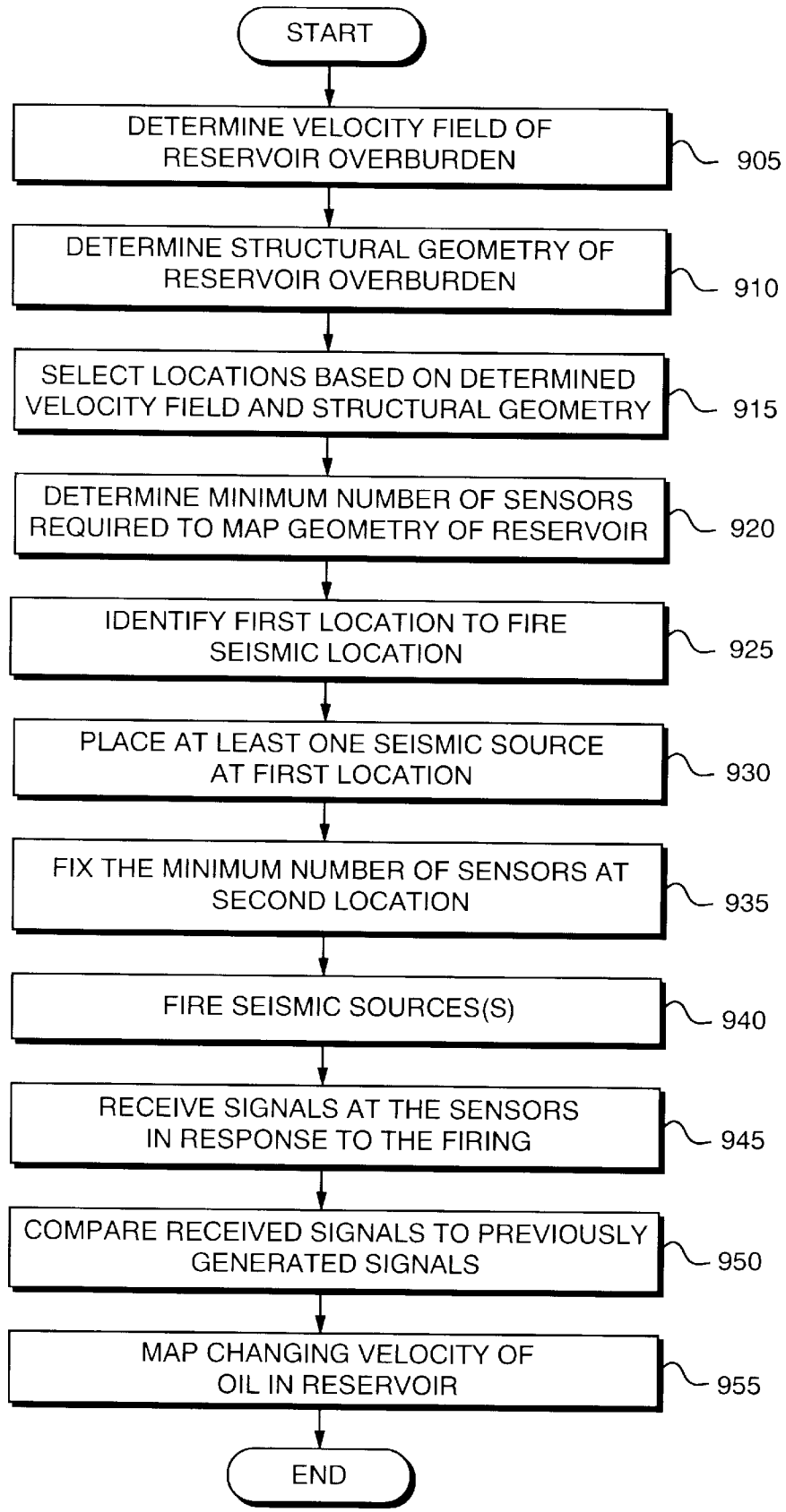
FIG. 9 is a flow chart of a preferred embodiment of a method of gathering seismic information of an oil reservoir over time.
Figure 10:
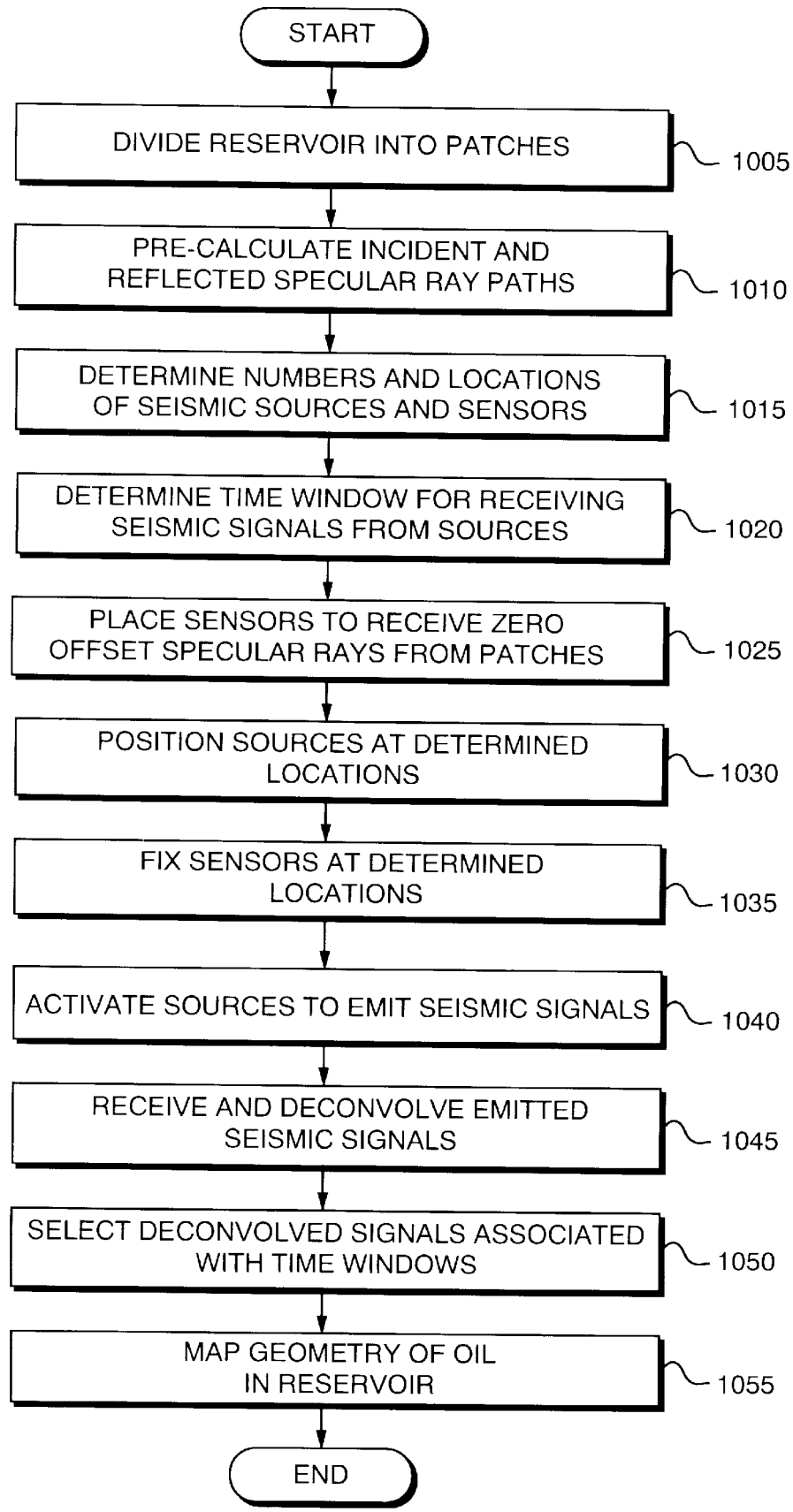
FIG. 10 is a flow chart of a preferred embodiment of the method incorporating calculating the path of specular rays and taking measurements only during a time window.

FIG. 8 shows the profile of the half-beam width in degrees. The dotted line 40 illustrates a profile slope (position on the graph not exact) of width versus frequency for a broadside array which is inversely proportional to frequency compared to the end-fire array 42 of this preferred embodiment. The direct beam is much narrower than the broad side beam.

The received sensor signals may be processed by known methods to track the reflectivity changes that represent the oil/water interface in oil reservoirs. Only the changes need be analyzed and tracked. The improved directed source and the fixed sensors combine to maintain system tolerance of ±1% over the frequency band of 15 to 100 Hz.

In a preferred embodiment the sensors are remotely operated with Internet command/control and data transfer via a cable to a platform, as discussed earlier.

Fold is a term of art meaning the sum of all the data collected. Since the present invention makes use of the known velocity field and the structure of the reservoir and directed multiple firings of sources and receiving specular reflections virtually no fold is required.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method of gathering seismic information of a geometry of an underground oil reservoir over time, comprising the steps of:

determining from a prior survey information, including previously received signals, a velocity field and a structural geometry of the underground oil reservoir overburden, selecting locations by precalculating positions of seismic sources and seismic sensors using said velocity field and said structural geometry, determining a minimum number of seismic sensors required to fully map the geometry of the underground oil reservoir.

identifying a first one of the selected locations for firing a seismic source to excite a number of seismic sensors.

placing at least one seismic source at the first one of the selected locations, fixing at least one seismic sensor to a solid surface of the earth at at least a second one of the selected locations, firing said at least one seismic source, receiving signals at said at least one seismic sensor in response to the firing, comparing said received signals to previously received signals, and mapping a changing geometry of oil in the underground oil reservoir.

2. The method as defined in claim 1 wherein the comparing of signals includes determining changes in reflectivity over time.

3. The method as defined in claim 1 wherein said step of selecting locations comprises identifying said selected locations from which a specular ray of zero and non-zero offset can be generated and received.

4. The method as defined in claim 1 further comprising:

fixing a plurality of the seismic sources, at a plurality of different ones of the selected locations.

5. The method as defined in claim 1 further comprising:

determining a set of selected locations for placement of said seismic sources such that each of the minimum number of seismic sensors is excited, firing said seismic sources at the set of selected locations repeatedly, integrating said received signals whereby signal to noise ratios are improved, and comparing said integrated received signals to previously received signals.

6. The method as defined in claim 1 wherein the underground oil reservoir is located in a marine environment, and the placing of at least one seismic source includes:

hanging said seismic sources vertically from a surface of the water, and synchronizing firing of the seismic sources from top to bottom such that each successive firing is in phase with prior firings.

7. The method as defined in claim 1, wherein the second one of the selected location is the same as the first one of the selected locations.

8. An apparatus for gathering seismic information of the oil water interface position over time, the apparatus comprising:

means for determining from a prior survey information, including previously received signals, a velocity field and a structural geometry of an underground oil reservoir overburden, means for selecting locations by precalculating positions of seismic sources and seismic sensors using said velocity field and said structural geometry, means to determine a minimum number of seismic sensors required to fully map the geometry of the underground oil reservoir.

means to identify a first one of the selected locations for firing a seismic source to excite a number of seismic sensors.

at least one seismic source placed at the first one of the selected locations, at least one seismic sensor fixed to a solid surface of the earth at at least a second one of the selected locations, means to fire said at least one seismic source, means to receive signals at said at least one seismic sensor in response to the firing, means for comparing said received signals to previously received signals, and means for mapping a changing geometry of the oil in the underground oil reservoir.

9. The apparatus as defined in claim 8 further comprising means for calculating changes in reflectivity over time.

10. The apparatus as defined in claim 8 wherein said precalculated positions can be sources of a specular ray and said precalculated positions can receive specular rays.

11. The apparatus as defined in claim 8 comprising:

a plurality of seismic sources, each of the seismic sources placed at a selected location from the plurality of selected locations, and a plurality of seismic sensors fixed to the solid surface of the earth, each of the seismic sensors placed at a selected location from the plurality of selected locations.

12. The apparatus as defined in claim 8 further comprising:

means for determining a set of selected locations for placement of said seismic sources such that each of the minimum number of seismic sensors is excited, means for repeatedly firing of said seismic sources at the set of selected locations, means for integrating said received signals such that signal to noise ratios are improved, and comparing said integrated received signals to previously received signals.

13. The apparatus as defined in claim 8 wherein the underground oil reservoir is located in a marine environment further comprising:

means for hanging at least one seismic source vertically from a surface of the water, and means for synchronizing firing of the seismic sources from top to bottom such that each successive firing is in phase with prior firings.

14. The apparatus as defined in claim 8 wherein the second one of the selected location is the same as the first one of the selected locations.

15. A method for gathering information of a geometry of an underground oil reservoir over time, comprising the steps of:

dividing a geometry of the underground oil reservoir into patches of known surface dimensions, pre-calculating incident and reflected specular ray paths from said patches, determining, from a known velocity above the underground oil reservoir and a known structure of the underground oil reservoir, minimum numbers and locations of seismic sources and seismic sensors and a time window for receiving seismic signals from the seismic sources, placing sensors to receive zero offset specular rays from some of said patches, wherein said seismic sensors also receive non-zero offset specular rays from other of said patches, positioning seismic sources at said locations, fixing said seismic sensors to a solid surface of the earth at said locations, activating the seismic sources to emit seismic signals, receiving the seismic signals and deconvolving said seismic signals to create deconvolved signals, selecting the deconvolved signals associated with said time window, and mapping the geometry of the oil in the underground oil reservoir.

16. An apparatus for gathering information of a geometry of an underground oil reservoir over time, comprising:

means for dividing a geometry of the underground oil reservoir into patches of known surface dimensions, means for pre-calculating incident and reflected specular ray paths from said patches, means for determining, from a known velocity above the underground oil reservoir and a known structure of the underground oil reservoir, minimum numbers and locations of seismic sources and seismic sensors and a time window for receiving seismic signals from the seismic sources, means for placing seismic sensors to receive zero offset specular rays from some of said patches, wherein said seismic sensors also receive non-zero offset specular rays from other of said patches, means for positioning seismic sources at said locations, means for fixing said seismic sensors to a solid surface of the earth at said locations, means for activating the seismic sources to emit seismic signals, means for receiving the seismic signals and deconvolving said seismic signals to create deconvolved signals, means for selecting the deconvolved signals associated with said time window, and means for mapping the geometry of oil in the underground oil reservoir.

* * * * *